United States Patent
Christian et al.

(10) Patent No.: US 9,446,539 B2
(45) Date of Patent: Sep. 20, 2016

(54) CONDUCTIVE ADHESIVE AND METHOD OF FORMING SAME

(75) Inventors: Benjamin R. Christian, Novi, MI (US); Jeffrey A. Abell, Rochester Hills, MI (US); Jessica E. Weber, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1327 days.

(21) Appl. No.: 13/309,845

(22) Filed: Dec. 2, 2011

(65) Prior Publication Data
US 2013/0142986 A1 Jun. 6, 2013

(51) Int. Cl.
| | |
|---|---|
| *B32B 9/00* | (2006.01) |
| *B29C 39/00* | (2006.01) |
| *C01B 31/02* | (2006.01) |
| *B29C 39/10* | (2006.01) |
| *C09J 9/02* | (2006.01) |
| *B82Y 30/00* | (2011.01) |

(52) U.S. Cl.
CPC ............. *B29C 39/006* (2013.01); *B29C 39/10* (2013.01); *C01B 31/022* (2013.01); *C09J 9/02* (2013.01); *B82Y 30/00* (2013.01); *Y10T 428/23979* (2015.04); *Y10T 428/30* (2015.01)

(58) Field of Classification Search
CPC ......... C01B 31/022–31/0293; C01B 2202/00; Y10T 428/30; Y10S 977/742
USPC ................. 428/408; 423/447.1, 448; 977/742
See application file for complete search history.

(56) References Cited

U.S. PATENT DOCUMENTS

| | | | | |
|---|---|---|---|---|
| 2005/0038225 | A1* | 2/2005 | Charati ................. | B82Y 10/00 528/272 |
| 2006/0073332 | A1* | 4/2006 | Huang ................... | B82Y 10/00 428/367 |
| 2008/0292840 | A1 | 11/2008 | Majumdar et al. | |
| 2009/0011232 | A1 | 1/2009 | Dai et al. | |
| 2010/0021736 | A1 | 1/2010 | Slinker et al. | |
| 2010/0075024 | A1* | 3/2010 | Ajayan ................... | C08K 7/24 427/66 |

OTHER PUBLICATIONS

Liangti Qu, Liming Dai, Morley Stone, Zhenhai Xia, Zhong Lin Wang, "Carbon Nanotube Arrays with Strong Shear Binding-On and Easy Normal Lifting-Off", Science Magazine, Oct. 10, 2008, pp. 238-242, vol. 322.
Liangti Qu, Liming Dai, "Gecko-Foot-Mimetic Aligned Single-Walled Carbon Nanotube Dry Adhesives with Unique Electrical and Thermal Properties", Advanced Materials, 2007, pp. 3844-3849, vol. 19.

* cited by examiner

*Primary Examiner* — Daniel H Miller
(74) *Attorney, Agent, or Firm* — Quinn Law Group, PLLC

(57) ABSTRACT

A method of forming a conductive adhesive includes condensation-polymerizing a carrier onto a plurality of carbon nanotubes each disposed on a substrate and having a first end and a second end spaced opposite the first end. The carrier is spaced apart from the substrate so that each of the plurality of carbon nanotubes extends continuously through the carrier such that the first end and the second end are spaced apart from the carrier. After condensation-polymerizing, the method includes removing the substrate from the plurality of carbon nanotubes without removing the carrier from the plurality of carbon nanotubes to thereby form the conductive adhesive. A conductive adhesive for removably joining a first surface and a second surface is also disclosed.

14 Claims, 2 Drawing Sheets

US 9,446,539 B2

CONDUCTIVE ADHESIVE AND METHOD OF FORMING SAME

TECHNICAL FIELD

The present disclosure generally relates to conductive adhesives and methods of forming a conductive adhesive.

BACKGROUND

Conductive adhesives are often useful for joining conductive surfaces of electrically- and/or thermally-conductive applications. For example, a conductive adhesive may be useful for joining two surfaces of a semiconductor. Such conductive adhesives not only adhere two surfaces together, but also readily conduct electrical and/or thermal energy.

SUMMARY

A method of forming a conductive adhesive for removably joining a first surface and a second surface includes condensation-polymerizing a carrier onto a plurality of carbon nanotubes each disposed on a substrate. Each of the plurality of carbon nanotubes has a first end and a second end spaced opposite the first end. The carrier is spaced apart from the substrate so that each of the plurality of carbon nanotubes extends continuously through the carrier such that the first end and the second end are spaced apart from the carrier. After condensation-polymerizing, the method includes removing the substrate from the plurality of carbon nanotubes without removing the carrier from the plurality of carbon nanotubes to thereby form the conductive adhesive.

In one embodiment, the method includes applying a dicarboxylic acid onto the plurality of carbon nanotubes each disposed on the substrate to form a first layer adjacent to the substrate. The method also includes applying a diamide onto the first layer to form a second layer, wherein the first layer is sandwiched between the second layer and the substrate. After applying the diamide, the method includes condensation-polymerizing the carrier onto the plurality of carbon nanotubes. The carrier is spaced apart from the substrate so that each of the plurality of carbon nanotubes extends continuously through the carrier such that the first end and the second end are spaced apart from the carrier. After condensation-polymerizing, the method includes washing the diamide from the carrier without removing the carrier from the plurality of carbon nanotubes. The method further includes, after washing, removing the substrate from the plurality of carbon nanotubes without removing the carrier from the plurality of carbon nanotubes. After removing, the method includes washing the dicarboxylic acid from the carrier without removing the carrier from the plurality of carbon nanotubes to thereby form the conductive adhesive.

A conductive adhesive for removably joining a first surface and a second surface includes a plurality of carbon nanotubes, and a carrier formed from a condensation polymer. Each of the plurality of carbon nanotubes has a first end and a second end spaced opposite the first end, and each of the plurality of carbon nanotubes extends continuously through the carrier such that the first end and the second end are spaced apart from the carrier.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

DETAILED DESCRIPTION

Figure 1A:
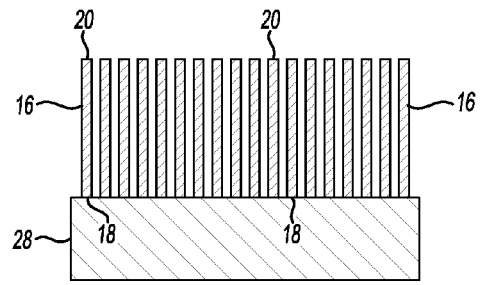
FIG. 1A is a schematic illustration of a cross-sectional view of a plurality of carbon nanotubes disposed on a substrate.
Figure 1B:
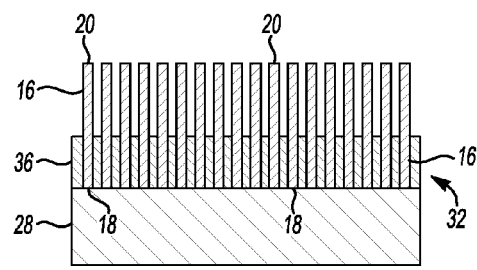
FIG. 1B is a schematic illustration of a cross-sectional view of a first layer formed from a first polymer precursor and disposed on the substrate of FIG. 1A.
Figure 1C:
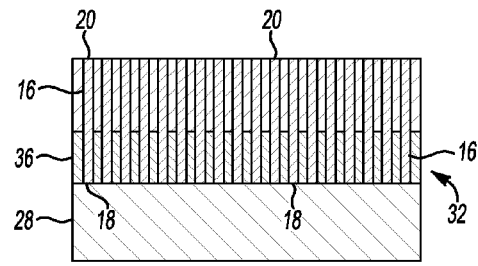
FIG. 1C is a schematic illustration of a cross-sectional view of a second layer formed from a second polymer precursor and disposed on the first layer of FIG. 1B.

Referring to the Figures, wherein like reference numerals refer to like elements, a conductive adhesive for removably joining a first surface 12 (FIGS. 4A-4D) and a second surface 14 (FIGS. 4B-4D) is shown generally at 10 in FIGS. 2-4D. The conductive adhesive 10 may be useful for electrically- and/or thermally-conductive applications requiring removable joining of the first surface 12 and the second surface 14. For example, the conductive adhesive 10 may be useful for joining two battery tabs (not shown) of a lithium ion battery (not shown) for an automotive vehicle (not shown). Alternatively, the conductive adhesive 10 may be useful for joining conduits or hoses (not shown) to receptacles (not shown) for automotive applications. That is, the conductive adhesive 10 may replace solder or other forms of mechanical attachment, e.g., clamps, welds, or screws, for electrically- and/or thermally-conductive automotive applications. However, the conductive adhesive 10 may also be useful for non-automotive applications such as, but not limited to, removably joining surfaces 12, 14 for aviation, rail, and marine applications. As used herein and as set forth in more detail below, the terminology removably joining refers to joining the first surface 12 and the second surface 14 such that the first and second surfaces 12, 14 may be sequentially and repeatedly attached to one another, separated or removed from one another, and reattached to one another, e.g., for repositioning the first surface 12 and/or the second surface 14. A method of forming the conductive adhesive 10 is also disclosed.

Figure 2:
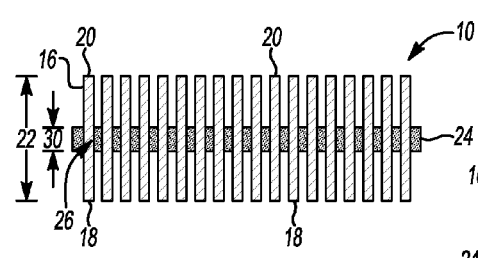
FIG. 2 is a schematic illustration of a cross-sectional view of a conductive adhesive including the carrier of FIG. 1D formed between adjacent ones of the plurality of carbon nanotubes of FIG. 1A, wherein unreacted first polymer precursor of FIG. 1B has been removed from the plurality of carbon nanotubes.
Figure 3:
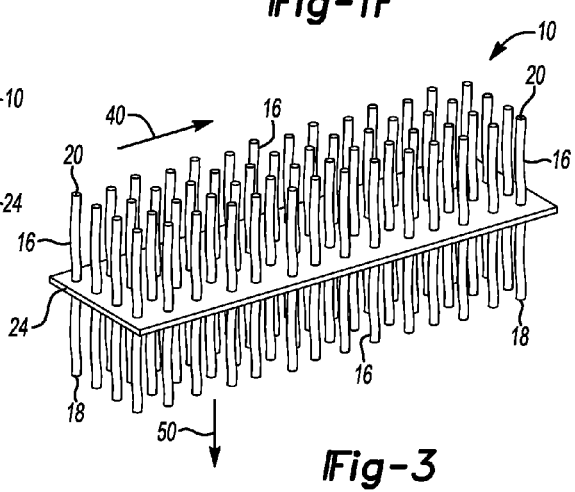
FIG. 3 is a schematic magnified perspective illustration of the conductive adhesive of FIG. 2.

With continued reference to FIGS. 2 and 3, the conductive adhesive 10 includes a plurality of carbon nanotubes 16 each having a first end 18 and a second end 20 spaced opposite the first end 18. Each of the plurality of carbon nanotubes 16 may be selected from the group including single-walled carbon nanotubes, multi-walled carbon nanotubes, and combinations thereof. The plurality of carbon nanotubes 16 may exhibit excellent mechanical properties such as Young's modulus and tensile strength. In particular, the plurality of carbon nanotubes 16 may exhibit an adhesion force in a shear direction (denoted generally by arrow 40 in FIG. 3) of from about 90 N $cm^{-2}$ to about 110 N $cm^{-2}$, and an adhesion force in a normal direction (denoted generally by arrow 50 in FIG. 3) of from about 5 N $cm^{-2}$ to about 15 N $cm^{-2}$. The plurality of carbon nanotubes 16 may have a tensile strength of from about 25 GPa to about 35 GPa. In addition, the plurality of carbon nanotubes 16 may have a Young's modulus of greater than or equal to about 1,000 GPa, e.g., about 1 TPa. Further, the plurality of carbon nanotubes 16 may exhibit electrical- and/or thermal-conductivity. That is, each of the plurality of carbon nanotubes 16 may transmit electrical and/or thermal energy between the first end 18 and the second end 20.

As best shown in FIG. 3, each of the plurality of carbon nanotubes 16 may have a generally tubular shape and may continuously extend between the first end 18 and the second end 20. In addition, as set forth in more detail below, the first end 18 may be configured for removably attaching to the first surface 12 (FIG. 4A) and the second end 20 may be configured for removably attaching to the second surface 14 (FIG. 4B).

Referring now to FIG. 2, each of the plurality of carbon nanotubes 16 may have a length 22. Although dependent upon a desired application of the conductive adhesive 10, the length 22 of each of the plurality of carbon nanotubes 16 may be from about 5 µm to about 15 µm, e.g., from about 8 µm to about 12 µm, wherein 1 µm is equal to $1 \times 10^{-6}$ m.

In addition, as described with continued reference to FIGS. 2 and 3, the conductive adhesive 10 also includes a carrier 24 formed from a condensation polymer. The carrier 24 may serve as a backing for the conductive adhesive 10 and may allow manual handling of the conductive adhesive 10. As such, the carrier 24 may be flexible.

As used herein, the terminology condensation polymer refers to a polymer formed by a condensation reaction, i.e., a chemical reaction in which two or more reactants yield a single main product with accompanying formation of water or some other small molecule such as ammonia, ethanol, acetic acid, or hydrogen sulfide. Stated differently, a condensation reaction is a chemical reaction in which two molecules or functional groups combine to form a single molecule and cast off a comparatively smaller molecule.

Non-limiting examples of suitable condensation polymers may include polyamides, polyacetals, and polyesters. In one example, the carrier 24 is formed from a polyamide. As used herein, the terminology polyamide refers to a polymer formed by the linkage of an amino group of one molecule and a carboxylic acid group of another molecule. That is, a polyamide refers to a polymer including monomers of amides joined by peptide bonds.

With continued reference to FIGS. 2 and 3, each of the plurality of carbon nanotubes 16 extends continuously through the carrier 24 such that the first end 18 and the second end 20 of each of the plurality of carbon nanotubes 16 is spaced apart from the carrier 24. That is, each of the plurality of carbon nanotubes 16 may extend continuously from the first end 18 to the second end 20 through the carrier 24. Stated differently, each of the plurality of carbon nanotubes 16 may extend uninterruptedly through the carrier 24.

In addition, as best shown in FIG. 3, the carrier 24 may be disposed between adjacent ones of the plurality of carbon nanotubes 16. That is, the carrier 24 may infiltrate between adjacent ones of the plurality of carbon nanotubes 16 to thereby fill spaces between each of the plurality of carbon nanotubes 16. However, more specifically, the carrier 24 may surround each of the plurality of carbon nanotubes 16 at only about a midpoint 26 (FIG. 2) of the length 22 (FIG. 2). That is, the carrier 24 may not surround the entire length 22 of each of the plurality of carbon nanotubes 16, but may rather be disposed at about the midpoint 26 of each of the plurality of carbon nanotubes 16.

The plurality of carbon nanotubes 16 may also be vertically-aligned. That is, with continued reference to FIG. 2, adjacent ones of the plurality of carbon nanotubes 16 may be aligned substantially parallel to one another, and may be disposed substantially perpendicular to the carrier 24. As such, although illustrated schematically in FIGS. 2 and 3, the plurality of carbon nanotubes 16 may extend "vertically" through the carrier 24, i.e., in a plane (not shown) substantially perpendicular to the carrier 24, to form a forest of carbon nanotubes 16. Therefore, each of the plurality of carbon nanotubes 16 may have a pillar-like or tower shape and may extend through the carrier 24 so as to be disposed orthogonal to the carrier 24.

The conductive adhesive 10 may be characterized as dry, and as such, may not require curing or evaporation of volatile organic components. The conductive adhesive 10 may also be characterized as a two-sided conductive adhesive 10, as set forth in more detail below. As such, the conductive adhesive 10 may be useful for joining at least two surfaces, e.g., the first and second surfaces 12, 14 (FIGS. 4B-4D).

Further, the conductive adhesive 10 may be useful for removably joining the first surface 12 and the second surface 14, wherein the first surface 12 and the second surface 14 are formed from different materials. By way of non-limiting examples, the first surface 12 may be formed from a first material such as aluminum, and the second surface 14 may be formed from a second material that is different from the first material, such as steel.

Referring generally to the Figures, a method of forming the conductive adhesive 10 (FIGS. 2 and 3) includes condensation-polymerizing the carrier 24 (FIGS. 2 and 3) onto the plurality of carbon nanotubes 16 each disposed on a substrate 28 (FIGS. 1A-1E). The substrate 28 may be formed from any suitable material, such as, but not limited to, polymer, metal, and fibrous underlayment. As such, as shown in FIG. 1A, the method may further include, before condensation-polymerizing, depositing the plurality of carbon nanotubes 16 onto the substrate 28.

The plurality of carbon nanotubes 16 may be deposited onto the substrate 28 in any manner. By way of non-limiting examples, the plurality of carbon nanotubes 16 may be deposited onto the substrate 28 by chemical vapor deposition, plasma enhanced chemical vapor deposition, arc discharge, and laser ablation. In particular, although illustrated generally in FIG. 1A, depositing may include aligning adjacent ones of the plurality of carbon nanotubes 16 substantially parallel to one another and substantially perpendicular to the substrate 28. That is, each of the plurality of carbon nanotubes 16 may extend orthogonally from the substrate 28 so that the plurality of carbon nanotubes 16 form a forest or array of carbon nanotubes 16 on the substrate 28. In one variation, as a result of depositing, the first end 18 of each of the plurality of carbon nanotubes 16 may be disposed adjacent and in contact with the substrate 28. Alternatively, although not shown, as a result of depositing, the second end 20 of each of the plurality of carbon nanotubes 16 may be disposed adjacent and in contact with the substrate 28.

Further, although shown magnified and spaced apart for purposes of illustration in the Figures, the plurality of carbon nanotubes 16 may be tightly packed on the substrate 28. As a non-limiting example, the plurality of carbon nanotubes 16 may be deposited on the substrate 28 in the forest or array configuration having a density of from about $1 \times 10^{10}$ carbon nanotubes 16 per $cm^2$ to about $1 \times 10^{11}$ carbon nanotubes 16 per $cm^2$. However, the aforementioned density is merely exemplary, and fewer or more carbon nanotubes 16 may be deposited on the substrate 28.

Figure 1D:
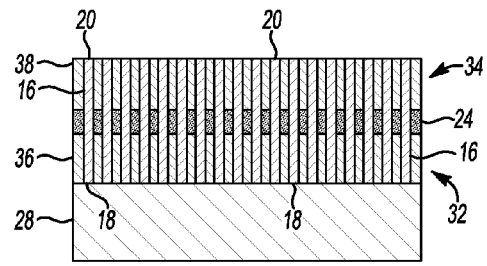
FIG. 1D is a schematic illustration of a cross-sectional view of a carrier formed by condensation-polymerizing the first polymer precursor of FIG. 1B and the second polymer precursor of FIG. 1C.
Figure 1E:
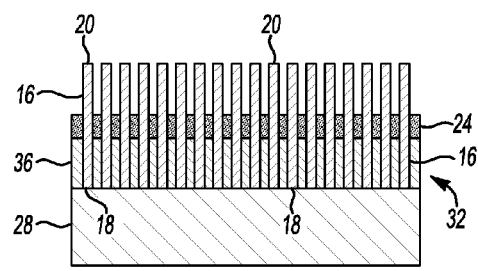
FIG. 1E is a schematic illustration of a cross-sectional view of the carrier of FIG. 1D, wherein unreacted second polymer precursor of FIG. 1C has been removed from the plurality of carbon nanotubes.

Referring again to the method, condensation-polymerizing may include forming the carrier 24 between adjacent ones of the plurality of carbon nanotubes 16. That is, condensation-polymerizing may include surrounding a portion 30 (FIG. 2) of each of the plurality of carbon nanotubes 16 with the carrier 24. More specifically, as illustrated generally in FIGS. 1D-1F and 2, condensation-polymerizing may include forming the carrier 24 at about the midpoint 26 (FIG. 2) of the length 22 (FIG. 2) so that the carrier 24 does not contact the substrate 28 (FIGS. 1D and 1E). Therefore, the carrier 24 is spaced apart from the substrate 28 so that each of the plurality of carbon nanotubes 16 extends continuously through the carrier 24 such that the first end 18 and the second end 20 are spaced apart from the carrier 24.

As shown in FIG. 1D, condensation-polymerizing may include reacting a first polymer precursor 32 and a second polymer precursor 34 that is reactive with the first polymer precursor 32. For example, the first polymer precursor 32 may be a dicarboxylic acid and the second polymer precursor 34 may be a diamide, as set forth in more detail below. Condensation-polymerizing may include forming the carrier 24 from any suitable first polymer precursor 32 and any suitable second polymer precursor 34 to form any suitable condensation polymer.

For example, in one embodiment, condensation-polymerizing may include forming the carrier 24 from a polyamide between adjacent ones of the plurality of carbon nanotubes 16. In another embodiment, condensation-polymerizing may include forming the carrier 24 from a polyacetal between adjacent ones of the plurality of carbon nanotubes 16. In yet another embodiment, condensation-polymerizing may include forming the carrier 24 from a polyester between adjacent ones of the plurality of carbon nanotubes 16.

Referring now to FIGS. 1E and 2, the method also includes, after condensation-polymerizing, removing the substrate 28 (FIG. 1E) from the plurality of carbon nanotubes 16 without removing the carrier 24 from the plurality of carbon nanotubes 16 to thereby form the conductive adhesive 10 (FIG. 2). For example, after the condensation polymer, i.e., the carrier 24, is formed via condensation polymerization as set forth above, the substrate 28 may be peeled from the first end 18 of each of the plurality of carbon nanotubes 16 to thereby remove the substrate 28 without removing the carrier 24 from the plurality of carbon nanotubes 16. That is, for the method, only the substrate 28 is removed from the plurality of carbon nanotubes 16. The carrier 24 is not removed, but rather remains disposed at about the midpoint 26 (FIG. 2) of the length 22 (FIG. 2) of each of the plurality of carbon nanotubes 16.

Figure 4A:
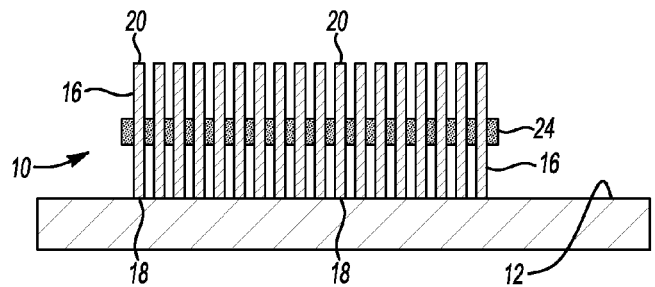
FIG. 4A is a schematic illustration of a cross-sectional view of the conductive adhesive of FIGS. 2 and 3 attached to a first surface.
Figure 4B:
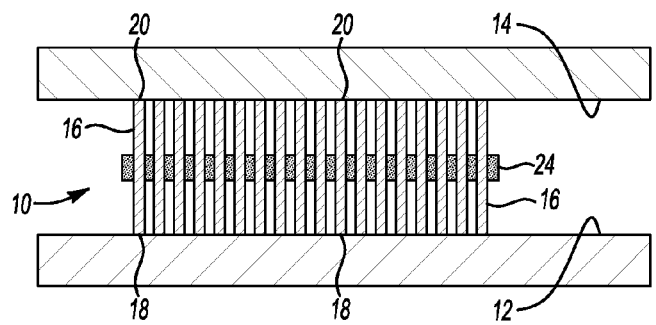
FIG. 4B is a schematic illustration of a cross-sectional view of the conductive adhesive of FIGS. 2 and 3 attached to the first surface of FIG. 4A and a second surface.
Figure 4C:
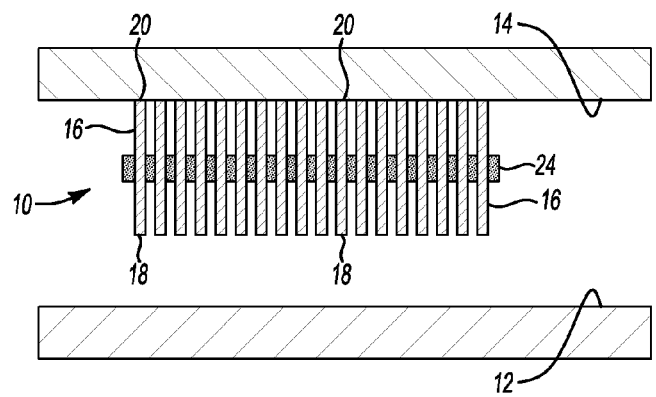
FIG. 4C is a schematic illustration of a cross-sectional view of the conductive adhesive of FIGS. 2 and 3 separated from the first surface of FIG. 4A.
Figure 4D:
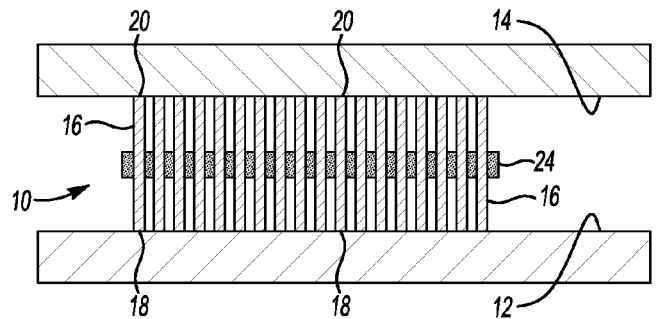
FIG. 4D is a schematic illustration of a cross-sectional view of the conductive adhesive of FIG. 4C reattached to the first surface of FIG. 4A.

Referring now to FIG. 4A, the method may further include attaching the conductive adhesive 10 to the first surface 12, wherein the first end 18 of each of the plurality of carbon nanotubes 16 is attached to the first surface 12. That is, the first end 18 of each of the plurality of carbon nanotubes 16 may be disposed adjacent and in contact with the first surface 12, and the first end 18 may adhere to the first surface 12 by van der Waals forces to thereby hold the conductive adhesive 10 to the first surface 12. Stated differently, the interaction of van der Waals forces between the first end 18 of each of the plurality of carbon nanotubes 16 and the first surface 12 may operate to bond or join the first surface 12 to the conductive adhesive 10.

Referring to FIG. 4B, after attaching the conductive adhesive 10 to the first surface 12, the method may include attaching the second end 20 of each of the plurality of carbon nanotubes 16 to the second surface 14. That is, the second end 20 of each of the plurality of carbon nanotubes 16 may be disposed adjacent and in contact with the second surface 14, and the second end 20 may adhere to the second surface 14 by van der Waals forces to thereby hold the conductive adhesive 10 to the second surface 14. Stated differently, the interaction of van der Waals forces between the second end 20 of each of the plurality of carbon nanotubes 16 and the second surface 14 may operate to bond or join the second surface 14 to the conductive adhesive 10.

In addition, referring to FIG. 4C, the method may further include separating at least one of the first surface 12 and the second surface 14 from the conductive adhesive 10. For example, the method may include detaching the first end 18 of each of the plurality of carbon nanotubes 16 from the first surface 12. Alternatively or additionally, the method may include detaching the second end 20 of each of the plurality of carbon nanotubes 16 from the second surface 14. The conductive adhesive 10 may be separated from the at least one of the first surface 12 and the second surface 14 by any technique. For example, the conductive adhesive 10 may be peeled from at least one of the first surface 12 and the second surface 14 so as to interrupt the van der Waals forces between the first end 18 of each of the plurality of carbon nanotubes 16 and the first surface 12 and/or the second end 20 of each of the plurality of carbon nanotubes 16 and the second surface 14.

Referring to FIG. 4D, the method may also include, after separating, reattaching the at least one of the first surface 12 and the second surface 14 to the conductive adhesive 10 to thereby removably join the first surface 12 and the second surface 14. That is, as set forth above, reattaching may include attaching the first end 18 of each of the plurality of carbon nanotubes 16 to the first surface 12. As such, the first end 18 of each of the plurality of carbon nanotubes 16 may be disposed adjacent and in contact with the first surface 12, and the first end 18 may adhere to the first surface 12 by van der Waals forces to thereby hold the conductive adhesive 10 to the first surface 12. Stated differently, the interaction of van der Waals forces between the first end 18 of each of the plurality of carbon nanotubes 16 and the first surface 12 may operate to bond or join the first surface 12 to the conductive adhesive 10. Alternatively or additionally, reattaching may include attaching the second end 20 of each of the plurality of carbon nanotubes 16 to the second surface 14. As such, the second end 20 of each of the plurality of carbon nanotubes 16 may be disposed adjacent and in contact with the second surface 14, and the second end 20 may adhere to the second surface 14 by van der Waals forces to thereby hold the conductive adhesive 10 to the second surface 14. Stated differently, the interaction of van der Waals forces between the second end 20 of each of the plurality of carbon nanotubes 16 and the second surface 14 may operate to bond the second surface 14 to the conductive adhesive 10.

Therefore, the conductive adhesive 10 may be repeatedly removably joined to the first surface 12 and/or the second surface 14.

In another embodiment, referring again to FIGS. 1A-2, the method includes condensation-polymerizing the carrier 24 formed from a polyamide onto the plurality of carbon nanotubes 16. For this embodiment, the method may include applying a dicarboxylic acid onto the plurality of carbon nanotubes 16 disposed on the substrate 28 to form a first layer 36 (FIGS. 1B-1F) adjacent to the substrate 28. That is, the first layer 36 may be disposed in contact with the substrate 28. The dicarboxylic acid may be applied onto the plurality of carbon nanotubes 16 by dispensing the dicarboxylic acid onto the plurality of carbon nanotubes 16 under controlled pressure so as to infiltrate the plurality of carbon nanotubes 16. Optionally, the plurality of carbon nanotubes 16 may be pretreated prior to applying the dicarboxylic acid to the plurality of carbon nanotubes 16.

Suitable dicarboxylic acids include two carboxyl groups and may be characterized by the chemical formula HOOC—R—COOH, wherein R may be an alkyl group, alkenyl group, alkynyl group, or aryl group. Non-limiting examples of dicarboxylic acids include, but are not limited to, oxalic acid, malonic acid, succinic acid, glutaric acid, adipic acid, and pimelic acid, (ortho-)phthalic acid, isophthalic acid, and terephthalic acid.

In this embodiment, referring to FIG. 1D, the method may also include applying a diamide onto the first layer 36 to form a second layer 38, wherein the first layer 36 is sandwiched between the second layer 38 and the substrate 28. That is, the second layer 38 may be disposed in contact with the first layer 36 so that the first layer 36 contacts both the substrate 28 and the second layer 38. Since the first layer 36 may be formed from the dicarboxylic acid, the first layer 36 may include polar functional groups and may generally have a comparatively lower viscosity than the second layer 38. As such, the first layer 36 may be formed adjacent to the substrate 28 while the second layer 38 is formed adjacent to the first layer 36.

With continued reference to FIG. 1D, the diamide may be applied onto the plurality of carbon nanotubes 16 by wiping the diamide onto the first layer 36 under controlled pressure and speed so as to form the second layer 38. As the first layer 36 contacts the second layer 38, the polyamide, i.e., the carrier 24, is formed via condensation-polymerization as set forth above.

Suitable diamides include two amide groups and may be characterized by the chemical formula RCONR$^2$, wherein R may be an alkyl group, alkenyl group, alkynyl group, or aryl group. Non-limiting examples of suitable diamides include acetamide, heaxamide, and aromatic amides such as cyclohexanecarboxamide.

Referring again to FIG. 1D, the method also includes, after applying the diamide, condensation-polymerizing the carrier 24 onto the plurality of carbon nanotubes 16. Therefore, for the specific embodiment set forth above, the method includes, after applying the diamide, condensation-polymerizing the carrier 24 formed from a polyamide. That is, the carrier 24 condenses and polymerizes at an interface between the first polymer precursor 32 and the second polymer precursor 34. For this embodiment, condensation-polymerizing includes reacting the first polymer precursor 32, i.e., the dicarboxylic acid, and the second polymer precursor 34, i.e., the diamide, to form the carrier 24, i.e., the polyamide. As a result of condensation-polymerizing, as best shown in FIG. 1D, the carrier 24 is spaced apart from the substrate 28 so that each of the plurality of carbon nanotubes 16 extends continuously through the carrier 24 such that the first end 18 and the second end 20 are spaced apart from the carrier 24. That is, condensation-polymerizing the carrier 24 forms the carrier 24 at about the midpoint 26 (FIG. 2) of the length 22 (FIG. 2) of each of the plurality of carbon nanotubes 16.

Referring now to FIG. 1E, for this embodiment, after condensation-polymerizing, the method includes washing the diamide from the carrier 24 without removing the carrier 24 from the plurality of carbon nanotubes 16. For example, any unreacted or excess diamide may be removed from the formed carrier 24 by diluting, flushing, and/or washing the diamide from the carrier 24. However, only the unreacted or excess diamide is removed, and the carrier 24 is not removed from the plurality of carbon nanotubes 16.

Figure 1F:
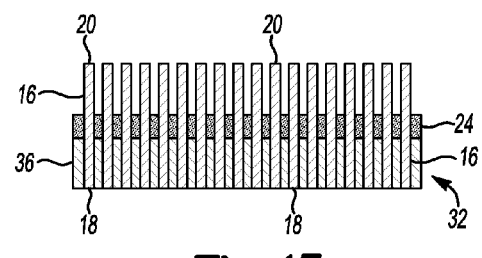
FIG. 1F is a schematic illustration of a cross-sectional view of the carrier of FIG. 1D, wherein the substrate of FIG. 1A has been removed from the plurality of carbon nanotubes.

In addition, referring to FIG. 1F, after washing, the method includes removing the substrate 28 from the plurality of carbon nanotubes 16 without removing the carrier 24 from the plurality of carbon nanotubes 16. For example, the substrate 28 may be peeled from the second end 20 of each of the plurality of carbon nanotubes 16 to thereby remove the substrate 28 without removing the carrier 24 from the plurality of carbon nanotubes 16. That is, for the method, only the substrate 28 is removed from the plurality of carbon nanotubes 16. The carrier 24 is not removed, but rather remains disposed at about the midpoint 26 (FIG. 2) of the length 22 (FIG. 2) of each of the plurality of carbon nanotubes 16.

Further, referring now to FIGS. 1F and 2, after removing the substrate 28 from the plurality of carbon nanotubes 16, the method may include washing the dicarboxylic acid from the carrier 24 without removing the carrier 24 from the plurality of carbon nanotubes 16 to thereby form the conductive adhesive 10. For example, any unreacted or excess dicarboxylic acid may be removed from the formed carrier 24 by diluting, flushing, and/or washing the dicarboxylic acid from the carrier 24. However, only the unreacted or excess dicarboxylic acid is removed, and the carrier 24 is not removed from the plurality of carbon nanotubes 16. Therefore, since the carrier 24 is not removed, each of the plurality of carbon nanotubes 16 extends continuously through the carrier 24. Further, the first end 18 and the second end 20 of each of the plurality of carbon nanotubes 16 is spaced apart from the carrier 24.

The conductive adhesive 10 exhibits excellent adhesive properties and electrical- and/or thermal-conductivity through the entire length 22 (FIG. 2) of each of the plurality of carbon nanotubes 16. In addition, the conductive adhesive 10 is reversibly removable from the first and second surfaces 12, 14 (FIG. 4D), and is therefore configured for removably joining the first surface 12 and the second surface 14. As such, the conductive adhesive 10 may be useful for electrically- and/or thermally-conductive applications such as battery tab joining, and may eliminate waste from otherwise destructive separation of battery tabs during battery maintenance operations. Further, the method of forming the conductive adhesive 10 is economical and allows for continuous formation or production of the conductive adhesive 10. Likewise, the method of joining the first surface 12 to the second surface 14 allows for repetitious separation and reattachment of surfaces 12, 14 without detrimentally affecting the adhesive properties and electrical- and/or thermal-conductivity of the conductive adhesive 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a conductive adhesive for removably joining a first surface and a second surface, the method comprising:
   condensation-polymerizing a carrier onto a plurality of carbon nanotubes, each of the carbon nanotubes being disposed on a substrate and having a first portion with a first end and a second portion with a second end spaced opposite the first end, the condensation-polymerizing including:
      forming a first layer of a first polymer precursor on the first portions of the carbon nanotubes,
      forming a second layer of a second polymer precursor on the second portions of the carbon nanotubes, and
      reacting the first polymer precursor with the second polymer precursor at an interface between the first layer and the second layer to create the carrier such that the carrier is spaced apart from the substrate, each of the plurality of carbon nanotubes extends continuously through the carrier, and the first ends and the second ends are spaced apart from the carrier,
   removing unreacted portions of the first and second layers; and
   after condensation-polymerizing, removing the substrate from the plurality of carbon nanotubes without removing the carrier from the plurality of carbon nanotubes to thereby form the conductive adhesive.

2. The method of claim 1, wherein condensation-polymerizing includes surrounding a portion of each of the plurality of carbon nanotubes with the carrier.

3. The method of claim 2, wherein condensation-polymerizing includes forming the carrier from a polyamide between adjacent ones of the plurality of carbon nanotubes.

4. The method of claim 1, wherein the first polymer precursor includes a dicarboxylic acid and the second polymer precursor includes a diamide that is reactive with the first polymer precursor.

5. The method of claim 1, wherein each of the plurality of carbon nanotubes has a length, and further wherein condensation-polymerizing includes forming the carrier at about a midpoint of the length so that the carrier does not contact the substrate.

6. The method of claim 5, further including attaching the conductive adhesive to the first surface, wherein the first end of each of the plurality of carbon nanotubes is attached to the first surface.

7. The method of claim 6, further including, after attaching the conductive adhesive to the first surface, attaching the second end of each of the plurality of carbon nanotubes to the second surface.

8. The method of claim 7, further including separating the first surface or the second surface from the conductive adhesive.

9. The method of claim 8, further including, after separating, reattaching the separated first surface or second surface to the conductive adhesive to thereby removably join the first surface and the second surface.

10. The method of claim 1, further including, before condensation-polymerizing, depositing the plurality of carbon nanotubes onto the substrate.

11. The method of claim 10, wherein depositing includes aligning adjacent ones of the plurality of carbon nanotubes substantially parallel to one another and substantially perpendicular to the substrate.

12. A method of forming a conductive adhesive for removably joining a first surface and a second surface, the method comprising:
   applying a dicarboxylic acid onto a plurality of carbon nanotubes, each disposed on a substrate and having a first end and a second end spaced opposite the first end, to form a first layer adjacent to the substrate;
   applying a diamide onto the first layer to form a second layer, wherein the first layer is sandwiched between the second layer and the substrate;
   after applying the diamide, condensation-polymerizing a carrier onto the plurality of carbon nanotubes such that the carrier is spaced apart from the substrate, each of the plurality of carbon nanotubes extends continuously through the carrier, and the first end and the second end are spaced apart from the carrier;
   after condensation-polymerizing, washing unreacted portions of the diamide from the carrier without removing the carrier from the plurality of carbon nanotubes;
   after washing, removing the substrate from the plurality of carbon nanotubes without removing the carrier from the plurality of carbon nanotubes; and
   after removing, washing unreacted portions of the dicarboxylic acid from the carrier without removing the carrier from the plurality of carbon nanotubes to thereby form the conductive adhesive.

13. The method of claim 1, wherein forming the first layer includes disposing the first polymer precursor in contact with the substrate, and forming the second layer includes disposing the second polymer precursor in contact with first layer such that the first layer is sandwiched between the substrate and the second layer.

14. The method of claim 1, wherein the substrate is removed before the second layer is removed.

\* \* \* \* \*